United States Patent
Kronbergs (10) Patent No.: US 12,401,422 B2
(45) Date of Patent: Aug. 26, 2025

(54) LIGHT SIGNAL DECODING DEVICE AND A LIGHT SIGNAL DECODING METHOD

(71) Applicant: ENTANGLE, SIA, Riga (LV)

(72) Inventor: Maris Kronbergs, Riga (LV)

(*) Notice: Subject to any disclaimer, the term of this patent is extended or adjusted under 35 U.S.C. 154(b) by 294 days.

(21) Appl. No.: 18/253,781

(22) PCT Filed: Nov. 22, 2021

(86) PCT No.: PCT/LV2021/050013
§ 371 (c)(1),
(2) Date: May 21, 2023

(87) PCT Pub. No.: WO2022/108433
PCT Pub. Date: May 27, 2022

(65) Prior Publication Data
US 2024/0014901 A1    Jan. 11, 2024

(30) Foreign Application Priority Data
Nov. 23, 2020  (LV) .......................... LVP2020000080

(51) Int. Cl.
*H04B 10/114*    (2013.01)
*G06N 3/045*    (2023.01)
(Continued)

(52) U.S. Cl.
CPC ........... *H04B 10/116* (2013.01); *G06N 3/045* (2023.01); *G06N 3/08* (2013.01); *G06N 3/084* (2013.01);
(Continued)

(58) Field of Classification Search
CPC .......... H04B 10/114–116; H04B 10/69; H04N 19/103; H04N 19/186; H04N 19/169; G06N 3/08
(Continued)

(56) References Cited

U.S. PATENT DOCUMENTS 5,577,178 A * 11/1996 Curry ..................... H04N 1/603
345/604
9,232,202 B2 * 1/2016 Togashi ................... H04N 9/64
(Continued)

FOREIGN PATENT DOCUMENTS

KR    20200057850 A *  5/2020    ............... G06N 3/08
WO    2010114863 A1   10/2010

OTHER PUBLICATIONS

International Search Report; NL; Mar. 22, 2022.
(Continued)

*Primary Examiner* — Li Liu
(74) *Attorney, Agent, or Firm* — Patshegen IP; Moshe Pinchas (57) ABSTRACT

Invention relates to a light signal decoding device and a light signal decoding method. The light signal decoding device comprises an image sensor configured to capture at least two different wavelength light signal, a memory configured to store an ANN (Artificial Neural Network) model. The ANN model comprises at least three input neurons, only two hidden layers and at least two output neurons as at least two data bits. The device comprises a processor configured to transform the captured at least two different wavelength light signal into at least two numeric values, sum two numeric values to obtain a C (Clear colour) value, and provide each numeric value and the C value as input neurons to the ANN model, wherein the ANN model apply Leaky ReLU activation function and ReLU activation function to obtain at least two output neurons as at least two data bits.

6 Claims, 5 Drawing Sheets

(51) Int. Cl.
  *G06N 3/08* (2023.01)
  *G06N 3/084* (2023.01)
  *H04B 10/116* (2013.01)
  *H04B 10/69* (2013.01)
  *H04N 19/169* (2014.01)

(52) U.S. Cl.
  CPC ........... *H04B 10/114* (2013.01); *H04B 10/69* (2013.01); *H04N 19/169* (2014.11)

(58) Field of Classification Search
  USPC .................. 398/118–120, 126–131, 118–119
  See application file for complete search history.

(56) References Cited

U.S. PATENT DOCUMENTS

| | | | |
|---|---|---|---|
| 11,677,948 B2 * | 6/2023 | Besenbruch | G06V 10/774 375/240.03 |
| 2019/0020411 A1 | 1/2019 | Kadambala et al. | |

OTHER PUBLICATIONS

Lee Hoon et al, "Deep learning based transceiver design for multi-colored VLC systems", Optics Express, US, (Mar. 5, 2018), vol. 26, No. 5, doi:10.1364/OE.26.006222, ISSN 1094-4087, p. 6222.

Pepe Alberto et al, "Heuristic, machine learning approach to 8-CSK decision regions in RGBLED visible light communication", vol. 3, No. 3, doi:10.1364/OSAC.381791, (Mar. 15, 2020), p. 473, OSA Continuum.

"IEEE Standard for Local and metropolitan area networks—Part 15.7: Short-Range Optical Wireless Communications ; IEEE Std 802.15.7-2018 (Revision of IEEE Std 802.15.7-2011)", IEEE Standard, IEEE, Piscataway, NJ USA, doi:10.1109/IEEESTD.2019. 8697198, ISBN 978-1-5044-5431-5, (Apr. 23, 2019), pp. 1-407, (Apr. 23, 2019).

Ahmed MD Faisal et al, "Design and Implementation of an OCC-Based Real-Time Heart Rate and Pulse-Oxygen Saturation Monitoring System", IEEE Access, IEEE, USA, (Oct. 28, 2020), vol. 8.

* cited by examiner

LIGHT SIGNAL DECODING DEVICE AND A LIGHT SIGNAL DECODING METHOD

Invention relates to optical transmission technologies, especially to light signal decoding devices and light signal decoding methods.

Security of data can be a concern when there is a transfer of data between devices. In particular, unauthorized interception of transferred data may be a concern. One of the options for secure communication is use of Li-Fi (light fidelity). The Li-Fi is wireless communication technology which utilizes light to transmit data and position between devices. It also allows to utilize faster transmission of data and faster internet connections—about 100 times faster than speeds achievable by Wi-Fi. Nevertheless, these advantages of Li-Fi require high computational power from the utilized devices that is holding back the technology to be brought into the daily use. Therefore, it is necessary to develop a device and a method which may provide aforementioned advantages of Li-Fi without high calculation or computational power demands.

U.S. Pat. No. 9,232,202 discloses a visible light transmitter, visible light receiver, visible light communication system, and visible light communication method. A visible light communication system having a transmission apparatus for modulating a transmission signal to a multiple-value number and a reception apparatus for demodulating a multiple-value modulated transmission signal is provided. Publication describes a system and method that calibrates colour reproduction using a Linear matrix scheme—comparison of predetermined values with actual captured values. Furthermore, this publication is specifically focusing on colour sending scheme.

Similar system is disclosed in publication of Ahmed MD Faisal et. al.: "Design and Implementation of an OCC-Based Real-Time Heart Rate and Pulse-Oxygen Saturation Monitoring System", IEEE ACCESS, IEEE, USA, vol. 8, 28 Oct. 2020. This publication describes the use of two neural network models. The first neural network model finds LED array location in the video feed. The second neural network model determines the colour of each LED. The system uses multiple neural networks with high computational requirements.

International patent application publication No. WO2010/114863 discloses a visible light communication system which includes a transmission apparatus and a reception apparatus, by which data information is delivered by manipulating characteristics of visible light signals. The proposed system of patent application No. WO2010/114863 creates a colour modulation scheme.

Korean patent application publication No. KR 2020 0057850 suggests a use of an apparatus for locating LED array in a captured image and for predicting LED colour using a neural network model in a VISUAL-MIMO environment and a method thereof. The described apparatus uses images as inputs for its neural network, which results in a considerable amount of input parameters, and subsequently the hidden layer has considerable amount of nodes increasing computational requirements to the apparatus.

Aim of the invention is to overcome aforementioned concerns and problems. The aim is reached by design of light signal decoding device and the light signal decoding method.

The present invention may be used with any light signal encoding device comprising a light signal generating device configured to generate at least a two different wavelength light signal. The at least two different wavelength light signal is a light signal comprising of at least two wavelengths. Accordingly, the three different wavelength light signal is a light signal comprising of three wavelengths. The light signal encoding device may comprise a memory configured to store pixel values for each combination of at least two bits to be sent via the two different wavelength light signal, and a processor configured to retrieve from the memory a necessary pixel colour value for at least two bits to be sent via the two different wavelength light signal and to control the light signal generating device so that it generates the two different wavelength light signal according to the retrieved pixel colour value or values.

The light signal encoding device may comprise a light generating device configured to generate RGB colour light signal. The device comprises a memory configured to store pixel RGB colour values for each combination of at least two bits to be sent via RGB colour signal. The device further comprises a processor configured to retrieve from the memory a necessary pixel RGB colour value for at least two bits to be sent via or as the RGB colour light signal and to control the RGB light generating device so that it generates the RGB colour light signal according to the retrieved pixel RGB colour value. In result, the information, which is bits, is sent out from the device as the RGB colour light signal having predetermined R colour value, G colour value, B colour value and C (Clear) colour value. The C colour value is a sum of R colour value, G colour value and B colour value. Meanwhile, the B colour value additionally serves as a clock signal.

The light generating device may be selected from the group of RGB LED (Red-Green-Blue Light Emitting Diode), LCD (Liquid Crystal Display) display, TFT (Thin Film Transistor) LCD display, LED display, OLED (Organic Light Emitting Diode) display, IPS (in-plane switching) LCD screen, plasma screen and any other display known from the present prior art.

The light signal may be encoded using the light signal encoding method having the following steps:
i) creating a list of pixel colour values where each pixel colour value corresponds to a respective at least two bits;
ii) receiving at least two bits to be sent via the two different wavelength light signal;
iii) retrieving a pixel colour signal value corresponding to the received at least two bits from the list of the pixel colour values; and
iv) generating the two different wavelength light signal representing retrieved pixel colour value or values.

The same aforementioned light encoding method may be implemented for three different wavelength light signal, for example for an RGB colour signal, or even with four or more different wavelength light signal. The method comprises the following steps:
i) creating a list of pixel colour values for the three different wavelength light signal where each pixel colour value corresponds to a respective at least two bits;
ii) receiving at least two bits to be sent via the three different wavelength light signal, preferably RGB colour light signal;
iii) retrieving a pixel colour value for the three different wavelength light signal corresponding to the received at least two bits from the list of the pixel colour values for the three different wavelength light signal; and
iv) generating the three different wavelength light signal, preferably the RGB colour signal representing retrieved pixel colour values for the three different wavelength light signal, preferably the RGB colour signal. Finally, the generated signal is sent out to a receiver or a device configured to receive the signal and decode said signal accordingly.

The present invention is a light signal decoding device. The light signal decoding device comprises at least the following elements. The light signal decoding device comprises an image sensor configured to capture at least two different wavelength light signal, a memory configured to store an ANN (Artificial Neural Network) model—a fully connected ANN model with ReLU and Leaky ReLU activation functions. The ANN model comprises at least three input neurons, only two hidden layers and at least two output neurons as at least two data bits. The ANN model is trained using Stochastic Gradient Descent training with augmented training data. The augmented training data comprises varying brightness and colour-biased light signal values. The device comprises a processor. The processor is configured to transform the captured two different wavelength light signal into two numeric values, sum two numeric values to obtain a C (Clear colour) value, provide each numeric value and the C value as input neurons to the ANN model, apply the Leaky ReLU activation function to the hidden layers and apply the ReLU activation function to the two output neurons, and decode, by use of the ANN model, two numeric values and C value into two probability values as two output neurons. The input layer comprises the input neurons and the output layer comprises output neurons. Using specifically ReLU and Leaky ReLU activation functions reduces the amount of needed calculations in the ANN model as compared to using other activation functions. In addition, each probability value is obtained in the range of 0 to 1. To obtain data bits, the 0.5 cut-off (threshold evaluation) is used. The output bit is 0 if the probability value is less than 0.5 and the output bit is 1 if the probability value is equal to or above 0.5, resulting in two output data bits. The 0.5 cut-off of output neuron probability values increases the speed of data processing in the ANN model. Therefore, each decoded light signal contains a code of at least two bits. In result of decoding of sequence of light signals a sequence of bits is obtained forming a data. The output resolution or bits to be obtained may be increased by training of the ANN model accordingly. It may be increased to three output bits, four output bits and further.

The bias is implemented in the ANN model, although in the given ANN model it is not being used which in turn increases the speed of data processing in the ANN model.

C (Clear colour) value is introduced as a new feature implemented in the ANN model, that helps represent training (input) data in latent space of the ANN model. C (Clear colour) value is the sum of all numeric values of the captured different wavelength light signal, resulting in the total value of light signal intensity, which is then sent as one of the input neurons of the ANN model.

The image sensor may be RGB sensor, CMOS (Complementary Metal-Oxide-Semiconductor) based image sensor, CCD (Charged Coupled Device) based image sensor, IR sensor or UV light sensor. In case of the RGB sensor, which is RGB photodiode, the captured pixel RGB value is directly sent to the ANN model for decoding. In case of CMOS and CCD, the captured RGB colour image frame is scaled to pixel RGB value as described below and then sent to the ANN model.

The ANN model comprises at least three input neurons as inputs, only two hidden layers and at least two output neurons as outputs. In the embodiment of the two different wavelength light signal there are three inputs. In the embodiment of the three different wavelength light signal, for example the RGB colour light signal, there are four inputs. These four inputs are as follows: R colour value, G colour value, B colour value and C colour value of the pixel RGB colour value. C colour value is a sum of R colour value, G colour value and B colour value. In the following embodiment, the processor of the light signal decoding device is configured to transform the captured RGB colour light signal into three numeric values, sum three numeric values to obtain a C value, apply the Leaky ReLU activation function to the hidden layers and apply the ReLU activation function to the two output neurons; and decode, by use of the ANN model, three numeric values and C value into at least two probability values as two output neurons. Each probability value is in the range of 0 to 1. The output bit is 0 if the probability value is less than 0.5, and the output bit is 1 if the probability value is equal to or above 0.5, resulting in two output data bits.

The input neurons are in the range of 3 to 64 neurons, preferably 3 to 32 neurons, more preferably 3 to 16 neurons, wherein each hidden layer of the ANN model includes at least 10 to 128 nodes, preferably 12 to 64 nodes, more preferably 12 to 32 nodes, and wherein the output neurons are in the range of 2 to 64 neurons, preferably 2 to 32 neurons, more preferably 2 to 16 neurons.

In another embodiment of the present invention, the ANN model comprises four input neurons, two hidden layers and three output neurons, wherein each input neuron is R colour value, G colour value, B colour value and C colour value of the pixel RGB colour value, wherein each hidden layer of the ANN model includes at least 10 to 128 nodes, preferably 12 to 64 nodes, more preferably 12 to 32 nodes, and wherein the three output neurons are three output data bits as a result of decoded data by means of processor (4) using the ANN model.

The present invention further comprises a light signal decoding method. The method comprises the following steps:
  a) capturing at least two different wavelength light signal;
  b) transforming the captured two different wavelength light signal into two numeric values;
  c) summing two numeric values to obtain a C (Clear colour) value;
  d) decoding said numeric values. The step of decoding of the numeric values includes the following sub-steps:
     d1) providing each numeric value and the C value as an input neuron to an ANN model;
     d2) applying the Leaky ReLU activation function to the hidden layers and apply the ReLU activation function to the two output neurons,
     d3) processing the numeric values and the C value as three input neurons through two hidden layers of the ANN model, in result of which two probability values as two output neurons are obtained. Each probability value is in the range of 0 to 1, and wherein the output bit is 0 if the probability value is less than 0.5, and the output bit is 1 if the probability value is equal to or above 0.5, resulting in at least two output data bits.

The following below describes implementation of the invention when decoding not a two different wavelength light signal, but a three different wavelength light signal, for example an RGB colour light signal. The method comprises the following steps:
  a) capturing an RGB colour light signal;
  b) transforming the captured RGB colour light signal into three numeric values;

c) summing three numeric values to obtain a C (Clear colour) value; and d) decoding said numeric values and the C value. The step of decoding includes the following sub-steps:

d1) providing each numeric value and the C value as each input neuron to an ANN model;

d2) applying the Leaky ReLU activation function to the hidden layers and apply the ReLU activation function to the three output neurons; and d3) processing numeric values and the C value as four input neurons through two hidden layers of the ANN model, in result of which three probability values as three output neurons are obtained. Each probability value is in the range of 0 to 1, and wherein the output bit is 0 if the probability value is less than 0.5, and the output bit is 1 if the probability value is equal to or above 0.5, resulting in three output data bits.

In case of CMOS and CCD, the captured RGB colour image frame requires additional processing to be ready for sending to the ANN model. The captured RGB colour image frame is scaled to one pixel RGB colour value and a rolling shutter effect is filtered out. The method further comprises capturing a RGB colour image frame or a sequence of RGB colour image frames. The following scaling process further comprises the following steps:

b1) scaling the captured RGB colour image frame to a 2×2 pixel image frame;

b2) calculating an average blue colour value between a top two pixels and a bottom two pixels of the 2×2 pixel image frame;

b3) comparing whether the average blue colour value of the top two pixels of the 2×2 pixel image frame differs from the average blue colour value of the bottom two pixels of the 2×2 pixel image frame;

b31) when the average blue colour value of the top two pixels does not differ from the average blue colour value of the bottom two pixels, then the 2×2 pixel image frame is scaled to 1 pixel image frame;

b32) when the average blue colour value of the top two pixels does differ from the average blue colour value of the bottom two pixels, then the two pixels where the average blue colour value is different from the average blue colour value of the previously sampled two pixels are scaled to 1 pixel image frame and the pixel RGB colour value of the 1 pixel image frame is sent to the ANN for performing the step c), which is separating the RGB colour value in R colour value, G colour value, B colour value and C colour value;

b4) comparing whether the average blue colour value of the 1 pixel image frame differs from the average blue colour value of the previously sampled the 1 pixel image frame;

b41) when the average blue colour value of the 1 pixel image frame does differ from the average blue colour value of the previously sampled 1 pixel image frame, then the pixel RGB colour value of the 1 pixel image frame is sent to the ANN for performing step c); and b42) when the average blue colour value of the 1 pixel image frame does not differ from the average blue colour value of the previously sampled 1 pixel image frame, then the 1 pixel image frame is discarded.

Image scaling is performed by implementation at least one of the following algorithms nearest neighbour interpolation; bilinear interpolation; bicubic interpolation and Fourier-based interpolation. Preferably the nearest neighbour interpolation for scaling of the image is used. The following method of scaling is advantageous as able to perform fast scaling on comparable less powerful processors.

The average blue colour value is used as a clock or clocking signal to synchronize encoding and decoding processes.

Comparison and selection of the average blue values of the top two pixels and bottom two pixels as well as the average blue values of the 1 pixel image frame from the average blue colour value of the previously sampled 1 pixel image frame allows to avoid a rolling shutter effect which in this present invention is considered as a noise.

The selected blue values sent to the ANN are stored for comparing with the next sampled and selected blue values.

The present invention also comprises a training method of ANN model. The training method comprises the steps of: i) obtaining a training data, wherein the training data comprises of plurality of training numeric values and C value, wherein for each training group, comprising of numeric values and C value, are designated at least two output data bits; and ii) training the ANN model with the obtained training data to produce a trained ANN model that is capable of producing output data bits based on numeric values and C value, wherein the ANN model is being trained based on the measured output data bits associated with each training group, comprising of numeric values and C value.

In a case of the decoding of the RGB colour signal the ANN model is prepared as follows: i) obtaining a training data, wherein the training data comprises of plurality of training pixel RGB colour values of the 1 pixel image frames consisting of R colour value, G colour value, B colour value and C colour value, wherein for each training pixel RGB colour value of the 1 pixel image frame are designated at least two output bits, wherein at least a batch of at least two pixel RGB colour values of the 1 pixel image frames is created and wherein each pixel RGB colour light value has R colour value, G colour value, B colour value and C colour value associated with at least two output bits; and ii) training the ANN model with the training data to produce a trained ANN model that is capable of producing at least two output bits based on pixel RGB colour value of the 1 pixel image frame, wherein the trained ANN model is trained based on the measured at least two output bits associated with each training RGB colour value. In one embodiment of the invention, obtaining a training data involves a creation of 11 batches, wherein each batch comprises different seven pixel RGB colour values of the 1 pixel image frame.

The present invention may be exploited in the range of the light spectrum from IR (Infra-red) to UV (Ultraviolet), preferably in a visible light spectrum. The two different wavelength light signal describes a minimum number of wavelengths to be encoded, transferred and decoded from the signal. It may also comprise three and more different wavelength light signal for example RGB light signal, which is three different wavelength light signal.

The invention will now be explained in more detail with reference to the accompanying figures. It should, however, be mentioned that the detailed description only describes principal embodiments of the invention, whereas other embodiments may be contemplated within the scope of the appended claims.

Other objects and features of the present invention will become apparent when viewed in light of the detailed description of the preferred embodiment when taken in conjunction with the attached figures and appended claims.

Figure 1:
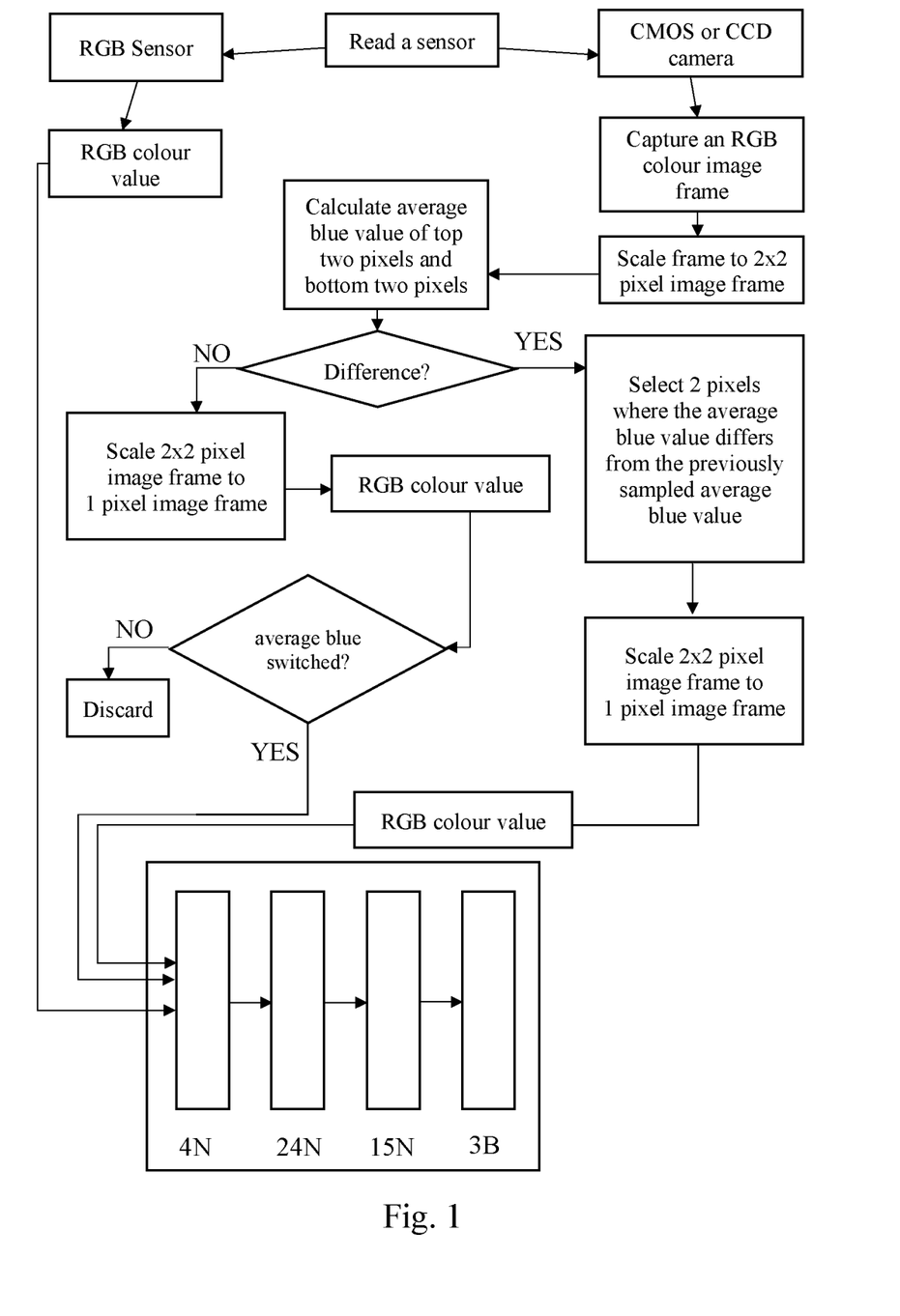
FIG. 1 is a flowchart illustrating an example embodiment of a three different wavelength light signal, for example an RGB colour signal, decoding method.

FIG. 1 illustrates a three different wavelength light signal, preferably an RGB colour signal, decoding method comprising the following steps:

a) capturing an RGB colour signal;
b) transforming the captured RGB colour signal to a pixel RGB colour value;
c) separating the RGB colour value in R colour value, G colour value, B colour value and C colour value;
d) decoding said four pixel RGB values, wherein the step d) includes the following sub-steps:
   d1) providing R colour value, G colour value and B colour value and C colour value as four inputs to an ANN model; and
   d2) processing the four inputs through two layers of the ANN model, in result of which the output is obtained as three output bits. The following method of decoding is when an RGB sensor is used as a sensor for capturing RGB signal.

In the embodiment, in which the RGB signal capturing sensor is CMOS or CCD camera, the RGB colour signal decoding method comprises the following steps (see FIG. 1):

a) capturing an RGB colour signal as a sequence of RGB colour image frames (10);
b) transforming the captured RGB colour signal as the RGB colour image frame (10) to the pixel RGB colour value (14) in the following manner:
   b1) scaling the captured RGB colour image frame (10) to a 2×2 pixel image frame (11) (see FIG. 2);
   b2) calculating an average blue colour value between a top two pixels (123) and a bottom two pixels (13) of the 2×2 pixel image frame (11);
   b3) comparing whether the average blue colour value of the top two pixels (12) of the 2×2 pixel image frame (11) differs from the average blue colour value of the bottom two pixels (12) of the 2×2 pixel image frame;
   b31) when the average blue colour value of the top two pixels (12) does not differ (10C) from the average blue colour value of the bottom two pixels (13), then the 2×2 pixel image frame (11) is scaled to 1 pixel image frame (14);
   b32) when the average blue colour value of the top two pixels (12) does differ (10A, 10B) from the average blue colour value of the bottom two pixels (13), then the two pixels where the average blue colour value is different from the average blue colour value of the previously sampled two pixels are scaled to 1 pixel image frame (14) and the pixel RGB colour value of the 1 pixel image frame (14) is sent to the ANN for performing the step c);
   b4) comparing whether the average blue colour value of the 1 pixel image frame (14) differs from the average blue colour value of the previously sampled the 1 pixel image frame (14);
   b41) when the average blue colour value of the 1 pixel image frame (14) does differ from the average blue colour value of the previously sampled the 1 pixel image frame (14), then the pixel RGB colour value of the 1 pixel image frame (14) is sent to the ANN for performing step c);
   b42) when the average blue colour value of the 1 pixel image frame (14) does not differ from the average blue colour value of the previously sampled the 1 pixel image frame (14), then the 1 pixel image frame (14) is discarded;
c) separating the RGB colour value in R colour value, G colour value, B colour value and C colour value;
d) decoding said four pixel RGB values, wherein the step d) includes the following sub-steps:
   d1) providing R colour value, G colour value and B colour value and C colour value as four inputs to an ANN model; and
   d2) processing the four inputs through two layers of the ANN model, in result of which the output is obtained as three output bits.

Figure 2:
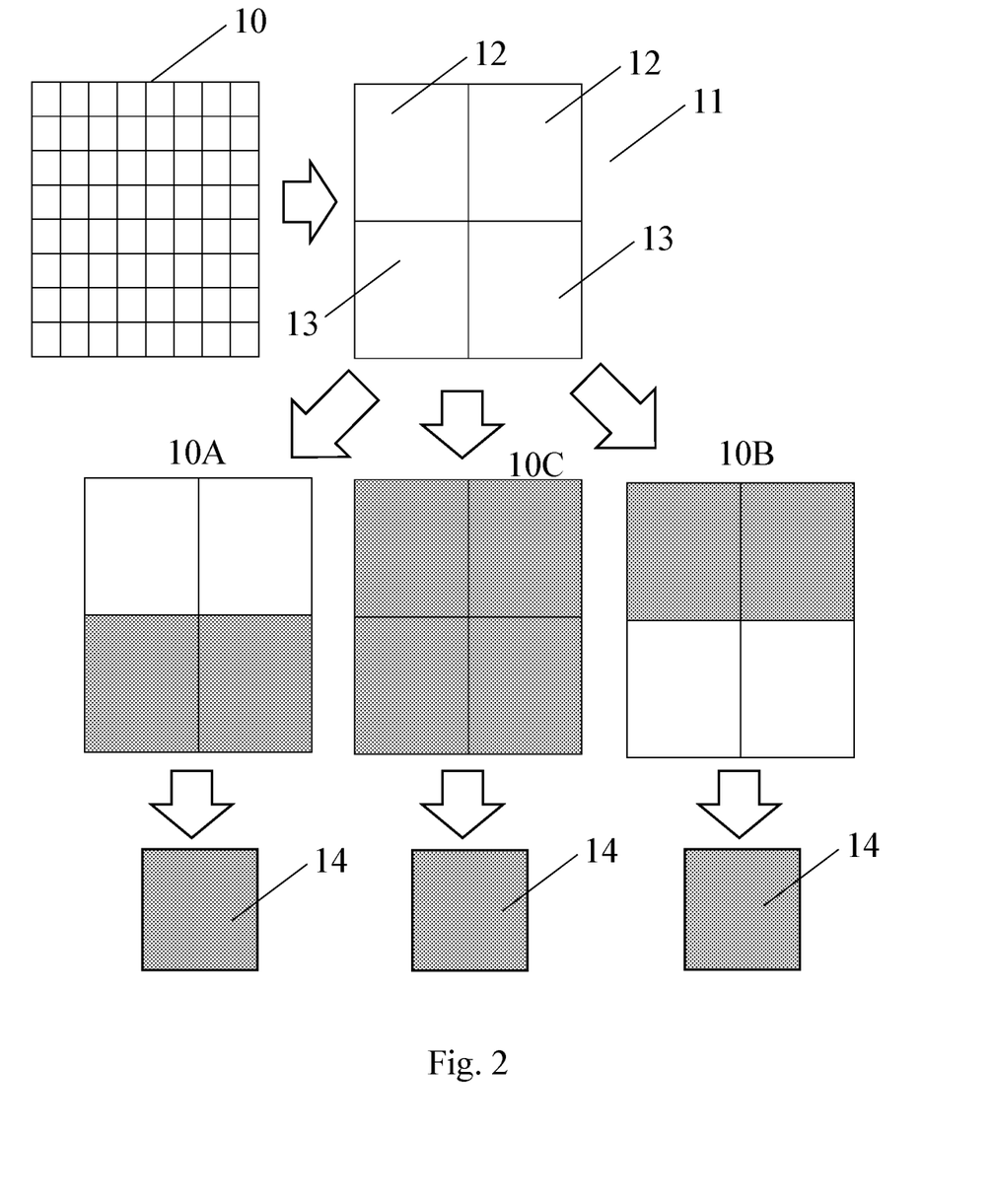
FIG. 2 illustrates a scaling of captured RGB colour image frame to 2×2 pixel RGB colour image frame followed by further scaling to 1 RGB colour pixel image frame or 1 RGB colour pixel having RGB colour value.

FIG. 2 illustrates a use of nearest neighbour interpolation for scaling of the image. The following method of scaling is advantageous as able to perform fast scaling on comparable less powerful processors.

Figure 3A:
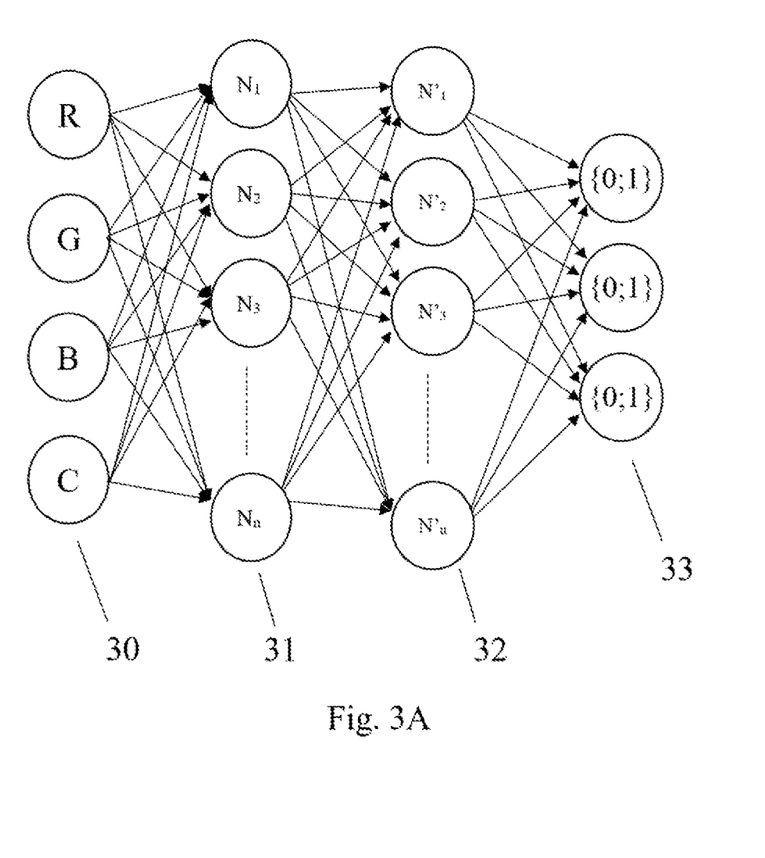
FIG. 3A illustrates an example of an artificial neural network (ANN) comprising an input layer of four inputs, an output layer of three outputs and only two hidden layers.

The ANN model is illustrated in FIG. 1 as well as in more detail in FIG. 3A. In FIG. 3A illustrates the ANN model comprising an input layer (30), an output layer (33) and two hidden layers (31; 32). The input layer (33) has four inputs: R colour value (R), G colour value (G) and B colour value (B) and C colour value (C). The first hidden layer (31) comprises 24 nodes ($N_1 \ldots N_n$), but the second hidden layer (32) comprises 15 nodes ($N'_1 \ldots N'_n$). The output layer (33) comprises three output bits which may be 1 (one) or 0 (zero).

The ANN model is trained using Stochastic Gradient Descent training with augmented training data. Augmented training data comprises varying brightness and colour-biased light signal values. The ANN model is trained or developed, first, by obtaining a training data set. The training data comprises of plurality of training pixel RGB colour values of the 1 pixel image frames consisting of R colour value, G colour value, B colour value and C colour value, wherein for each training pixel RGB colour value of the 1 pixel image frame are designated three output bits. Table 1 provides an example of training data-set for four inputs as. R colour value, G colour value, B colour value and C colour value and three outputs as a series of bits. Next, training of the ANN model is performed with the training data, as seen in Table 1, to produce a trained ANN model that is capable of producing at least two output bits based on pixel RGB colour value of the 1 pixel image frame, wherein the trained ANN model is trained based on the measured at least two output bits associated with each training RGB colour value. Weights are learned via a supervised training process, employing error backpropagation.

A batch of eight pixel RGB colour values is created or defined, wherein each pixel RGB colour value has R colour value, G colour value, B colour value and C colour value associated with three output bits. Moreover, for training of ANN to be able to work on different RGB signal decoding devices, like different cellular phones with cameras, multiple batches may be created. For example, 11 batches may be created, wherein each batch of different eight pixel RGB colour values represent one particular cellular phone camera characteristics.

TABLE 1

Example of RGB and C values and associated three output bits

| No. of RGB colour value | R colour value | G colour value | B colour value | C colour value | Associated three output bits |
|---|---|---|---|---|---|
| 1 | 1 | 9 | 32 | 42 | 000 |
| 2 | 26 | 11 | 34 | 71 | 001 |
| 3 | 12 | 46 | 43 | 101 | 010 |
| 4 | 37 | 48 | 46 | 131 | 100 |
| 5 | 25 | 2 | 3 | 30 | 101 |
| 6 | 36 | 40 | 14 | 90 | 110 |
| 7 | 1 | 1 | 1 | 3 | 011 |
| 8 | 4 | 47 | 12 | 63 | 111 |

Figure 3B:
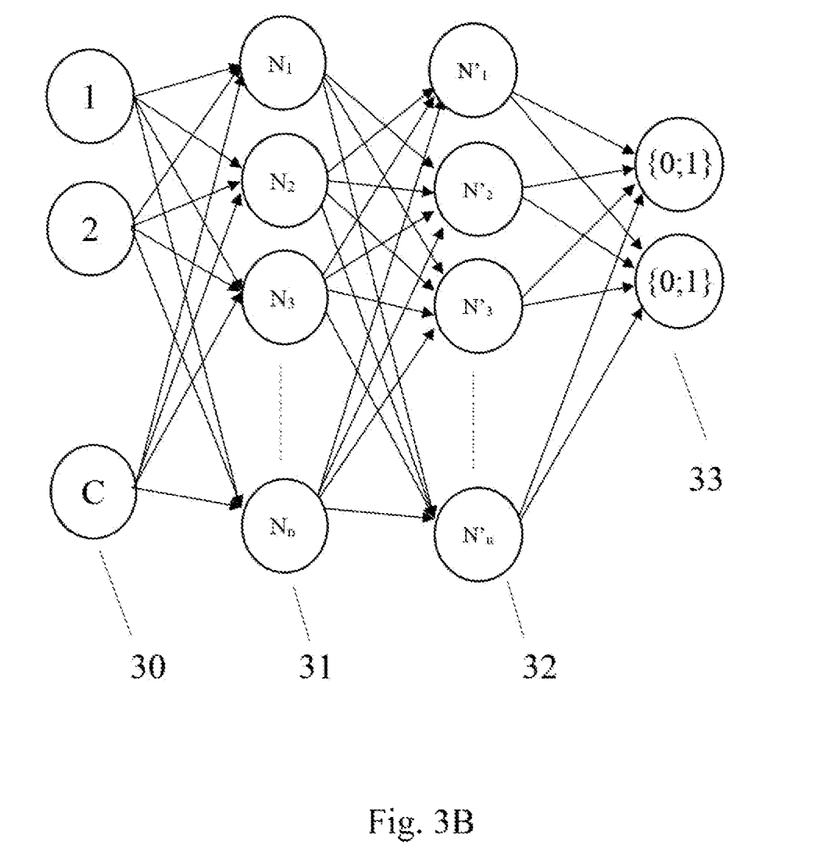
FIG. 3B illustrates another example of an artificial neural network (ANN) comprising an input layer of three inputs, an output layer of two outputs and only two hidden layers.

FIG. 3B illustrates another example of the ANN model comprising an input layer of three inputs, an output layer of two outputs and two hidden layers. In FIG. 3B illustrates the ANN model comprising an input layer (30), an output layer (33) and two hidden layers (31; 32). The input layer (33) has three inputs: the first colour value (1), the second colour value (2) and C colour value (C) as a sum of the first colour value (1) and the second colour value (2). The first hidden layer (31) comprises 24 nodes ($N_1 \ldots N_n$), but the second hidden layer (32) comprises 15 nodes ($N'_1 \ldots N'_n$). The output layer (33) comprises two output bits which may be 1 (one) or 0 (zero). The following example is for decoding a two different wavelength signal. Below is also a table No. 2 for the two pixel colour values and C values and associated two output bits used for training the ANN model and later on for operating aforementioned encoding and decoding methods.

TABLE 2

Example of two pixel colour values and C values and associated two output bits

| No. of colour value | First colour value | Second colour value | C colour value | Associated two output bits |
|---|---|---|---|---|
| 1 | 1 | 9 | 10 | 00 |
| 2 | 38 | 11 | 49 | 11 |
| 3 | 43 | 46 | 89 | 01 |
| 4 | 7 | 48 | 55 | 10 |

Figure 4:
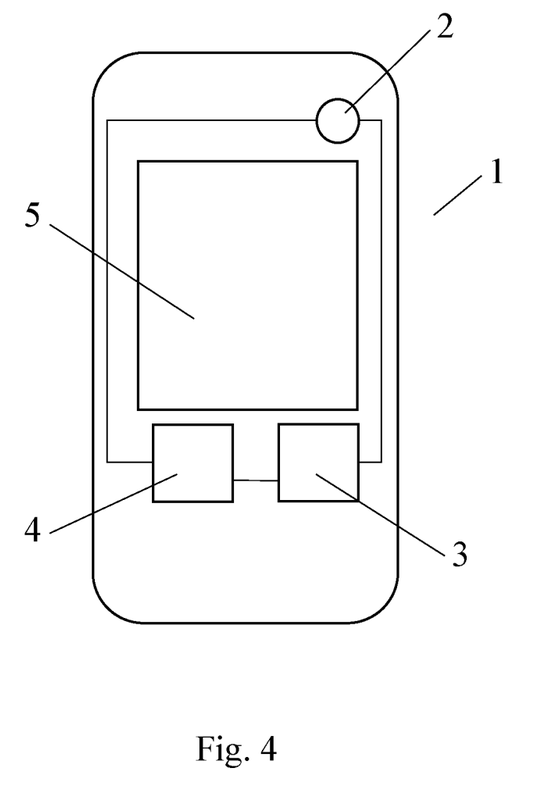
FIG. 4 illustrates an example of the RGB colour signal encoding and decoding device (1).

FIG. 4 illustrates an example of the RGB colour signal encoding and decoding device (1) which may be a cellular phone comprising an RGB light generating device (5) which is a display, and a memory (3) configured to store pixel RGB colour values for each combination of three bits to be sent via RGB colour signal for encoding purposes. The memory (3) is also configured to store an ANN model for decoding purposes as disclosed above. The device (1) further comprises an image sensor (2) which is CCD camera configured to capture a sequence of RGB colour signals. The RGB light generating device (5) serves as a transmitter of the RGB colour signal and the image sensor serves as a receiver of the RGB colour signal. The device (1) further a processor (4) configured to retrieve from the memory (3) a necessary pixel RGB colour value for at least three bits to be sent via RGB colour signal and to control the RGB light generating device (5) so that it generates the RGB colour signal according to the retrieved pixel RGB colour value. The aforementioned configuration of the processor (4) is for encoding purposes. For decoding purposes, the processor (4) is configured to transform a captured RGB colour signal to a pixel RGB colour value; separate the pixel RGB colour value in R colour value, G colour value, B colour value and C colour value, and decode, by use of ANN model, the said four pixel RGB colour values to at least two output bits, which is result of decoding the RGB colour signal.

While the invention may be susceptible to various modifications and alternative forms, specific embodiments of which have been shown by way of example in the figures and have been described in detail herein, it should be understood that the invention is not intended to be limited to the particular forms disclosed. Rather, the invention includes all modifications, equivalents, and alternatives falling within the scope of the invention as defined by the following claims.

The invention claimed is:

1. A light signal decoding device (1), comprising:
   an image sensor (2) configured to capture a three different wavelength light signal as an RGB colour light signal,
   a memory (3) configured to store an ANN (Artificial Neural Network) model, wherein the ANN model is a fully connected ANN model with ReLU and Leaky ReLU activation functions, and wherein the ANN model comprises at least three input neurons, two hidden layers and at least two outputs as at least two data bits, and
   a processor (4) configured to:
      transform the captured RGB colour light signal into three numeric values;
      sum three numeric values to obtain a C (Clear colour) value;
      apply the Leaky ReLU activation function to the hidden layers and apply the ReLU activation function to the two output neurons; and
      decode, by use of the ANN model, three numeric values and C value into at least two probability values as two output neurons, wherein each probability value is in the range of 0 to 1, and wherein the output bit is 0 if the probability value is less than 0.5, and the output bit is 1 if the probability value is equal to or above 0.5, resulting in two output data bits.

2. The light signal decoding device (1) according to claim 1, wherein the input neurons are in the range of 3 to 64 neurons, preferably 3 to 32 neurons, more preferably 3 to 16 neurons, wherein each hidden layer of the ANN model includes at least 10 to 128 nodes, preferably 12 to 64 nodes, more preferably 12 to 32 nodes, and wherein the output neurons are in the range of 2 to 64 neurons, preferably 2 to 32 neurons, more preferably 2 to 16 neurons.

3. The light signal decoding device (1) according to claim 1, wherein the ANN model comprises four input neurons, two hidden layers and three output neurons, wherein each input neuron is R colour value, G colour value, B colour value and C colour value of the pixel RGB colour value, wherein each hidden layer of the ANN model includes at least 10 to 128 nodes, preferably 12 to 64 nodes, more preferably 12 to 32 nodes, and wherein at least three output neurons are at least three output data bits as a result of decoded data by means of processor (4) using the ANN model.

4. Training method of ANN model according to claim 1, wherein the ANN model is trained using Stochastic Gradient Descent training with augmented training data the training method comprises the steps of:
   i) obtaining a training data, wherein the training data comprises of plurality of training numeric values and C value, wherein for each training group, comprising of numeric values and C value, are designated at least two output data bits; and ii) training the ANN model with the obtained training data to produce a trained ANN model that is capable of producing output data bits based on numeric values and C value, wherein the ANN model is being trained based on the measured output data bits associated with each training group, comprising of numeric values and C value, and wherein the training data comprise varying brightness and colour-biased light signal values.

5. A light signal decoding method, wherein the method comprises the following steps:
   a) capturing an RGB colour light signal;
   b) transforming the captured RGB colour light signal into three numeric values;
   c) summing three numeric values to obtain a C (Clear colour) value;
   d) decoding said numeric values and the C value, wherein the step of decoding includes the following sub-steps:
      d1) providing each numeric value and the C value as each input neuron to an ANN model;
      d2) applying the Leaky ReLU activation function to the hidden layers and applying the ReLU activation function to the three output neurons; and
      d3) processing numeric values and the C value as four input neurons through two hidden layers of the ANN model, in result of which three probability values as three output neurons are obtained, wherein each probability value is in the range of 0 to 1, and wherein the output bit is 0 if the probability value is less than 0.5, and the output bit is 1 if the probability value is equal to or above 0.5, resulting in three output data bits.

6. The light signal decoding method according to claim 5, wherein the step of capturing includes a capture of RGB colour image frame as the RGB colour light signal; and
   wherein the step of transforming captured RGB colour image frame further comprises the following steps:
      b1) scaling the captured RGB colour image frame to a 2×2 pixel image frame;
      b2) calculating an average blue colour value between a top two pixels and a bottom two pixels of the 2×2 pixel image frame;
      b3) comparing whether the average blue colour value of the top two pixels of the 2×2 pixel image frame differs from the average blue colour value of the bottom two pixels of the 2×2 pixel image frame;
      b31) when the average blue colour value of the top two pixels does not differ from the average blue colour value of the bottom two pixels, then the 2×2 pixel image frame is scaled to 1 pixel image frame;
      b32) when the average blue colour value of the top two pixels does differ from the average blue colour value of the bottom two pixels, then the two pixels where the average blue colour value is different from the average blue colour value of the previously sampled two pixels are scaled to 1 pixel image frame and the pixel RGB colour value of the 1 pixel image frame is sent to the ANN model for performing the step c);
      b4) comparing whether the average blue colour value of the 1 pixel image frame differs from the average blue colour value of the previously sampled the 1 pixel image frame;
      b41) when the average blue colour value of the 1 pixel image frame does differ from the average blue colour value of the previously sampled the 1 pixel image frame, then the pixel RGB colour value of the 1 pixel image frame is sent to the ANN model for performing step c);
      b42) when the average blue colour value of the 1 pixel image frame does not differ from the average blue colour value of the previously sampled the 1 pixel image frame, then the 1 pixel image frame is discarded; and
   wherein the average blue values sent to the ANN model are stored for sampling with the next average blue values.

* * * * *